W. P. Valentine,

Sawing Shingles,

No. 2,107, Reissued Nov. 14, 1865.

Witnesses:
Thomas J. Gardner
Philip Tell Dodge.

Inventor:
W. P. Valentine.
By H. C. Dodge
Attorney.

AM. PHOTO-LITHO. CO. N.Y. (OSBORNE'S PROCESS)

UNITED STATES PATENT OFFICE.

WILLIAM P. VALENTINE, OF FOND DU LAC, WISCONSIN.

IMPROVEMENT IN SHINGLE-MACHINES.

Specification forming part of Letters Patent No. 23,327, dated March 22, 1859; Reissue No. 2,107, dated November 14, 1865.

*To all whom it may concern:*

Be it known that I, WILLIAM P. VALENTINE, of Fond du Lac, in the county of Fond du Lac and State of Wisconsin, have invented a new and Improved Machine for Sawing Shingles; and I do hereby declare that the following is a full, clear, and exact description thereof, reference being had to the accompanying drawings, and to the letters of reference marked thereon—

Figure 1:
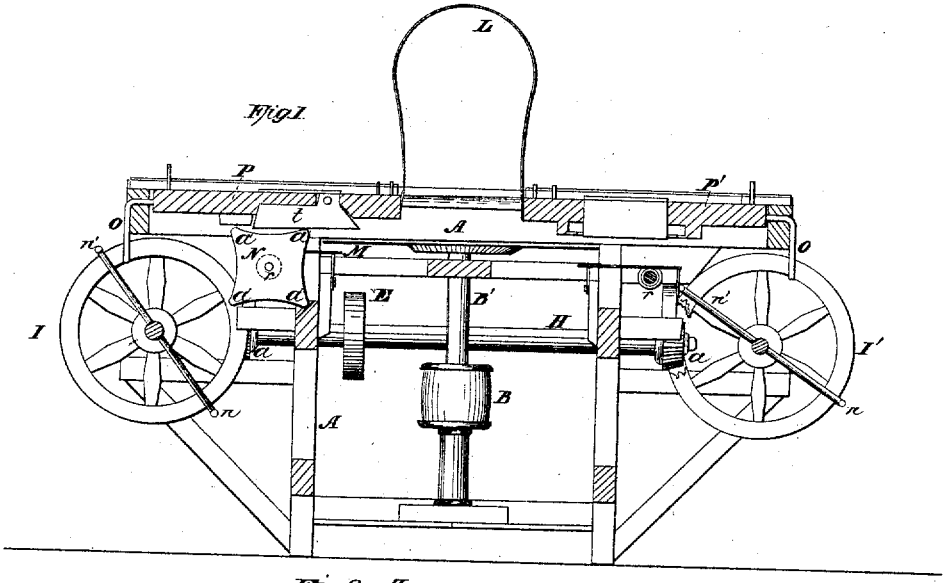
Figure 2:
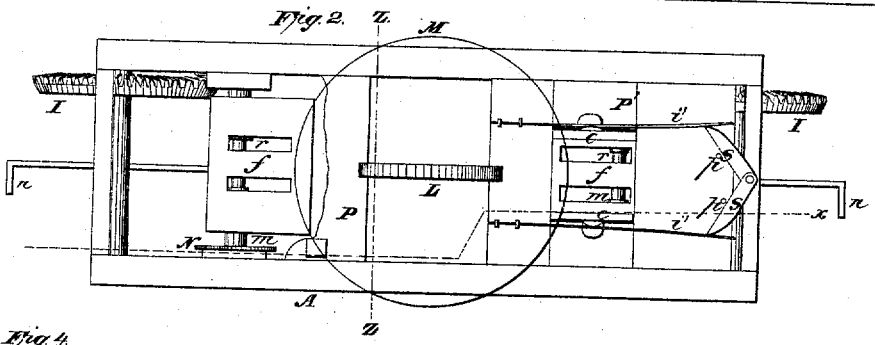

Figure 1 being a vertical longitudinal section taken on the line *x x* of Fig. 2. Fig. 2 is a top plan view, and Fig. 3 a transverse vertical section taken on the line of *z z* of Fig. 2.

Similar letters wherever they occur in the various figures represent corresponding parts.

The nature of my invention consists, first, in a novel arrangement of two carriages, operating alternately on opposite sides of the same saw; second, in an automatic device for locking and unlocking the bolt to be sawed; third, in giving to the carriages a variable feed-motion; fourth, in a novel method of presenting the bolt to the saw in a manner to cause the butt of the shingle to be cut alternately from opposite ends of the block, and in various mechanical details for producing the desired result.

To enable others skilled in the art to construct and use my improved machine, I will proceed to describe it.

A represents a frame of any suitable size and form to afford proper bearing for the various parts of the mechanism. In the center of this frame is located a vertical shaft, B′, upon the upper end of which is secured the circular saw M, as shown in Fig. 1. Upon this shaft B′ is mounted a pulley, B, to which motion is imparted by a belt from the driving-power. From the shaft B′ a belt passes to another vertical shaft, located at one side of the frame, (not shown in the drawings,) from whence a belt passes to the pulley E on the horizontal shaft H, this shaft H having a beveled pinion *a* secured to each end, gearing into the wheels I and I′.

In the upper portion of the frame A two sliding carriages, P and P′, are located in a position to move to and fro over the saw M. From the outer end of each of these carriages projects an arm or bent rod, O, so located as to be hit by the rod or arms *n* and *n′*, projecting at right angles from the shaft of wheels I and I′, as shown in Fig. 1.

It will be readily understood that when the saw is running idle—that is, when it is not cutting—it will attain a very high velocity, and that as the saw cuts deeper and deeper into the block its speed will gradually decrease. In order to accommodate the feed of the block to the saw, so as to vary it as the speed of the saw is varied, I arrange the arms *n* and *n′* in such a position that they shall begin to feed the carriage and block forward to the saw when the arm *n* or *n′* is nearly in a perpendicular position, at which time it will evidently impart to the carriage its greatest velocity, the forward motion of the carriage gradually decreasing as the arm *n* or *n′* impelling it approaches the horizontal position, the feed of the block to the saw being thus decreased as the velocity of the saw is decreased by cutting deeper and deeper into the block. In this manner the carriage is driven forward over the saw until the block is cut through, thus forming a shingle, by which time the arm *n* or *n′* will have passed and released the arm *o*, when the carriage will be instantly driven back by the spring L, and the carriage at the opposite end will be driven forward in the same manner. It will be observed that thus each carriage is moved forward and back alternately, and that while one is being moved up the other remains stationary at the outer end of the frame, thus giving the attendant opportunity and time for putting in a new block if necessary. In this way a shingle is cut from one block on one side of the saw, and then from the other on the opposite side, and so on continuously.

The bolts or blocks to be sawed are placed within the opening in the carriage, which is of course made of the proper size to permit them to drop therein readily and with ease, the blocks being placed crosswise of the frame, so as to cause the saw to cut lengthwise of the grain, whereby a very smooth surface is obtained.

Figure 3:
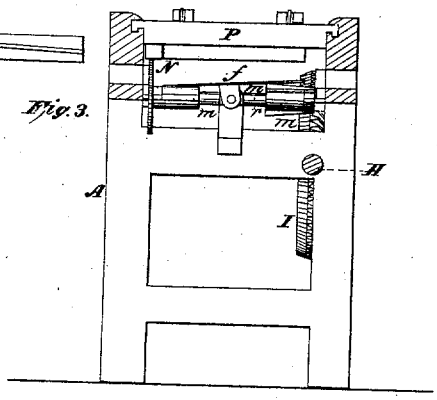

A dog, *c*, is placed at opposite sides of the opening in the carriages, as shown in Fig. 2, at the right-hand end of the frame, so as to seize and firmly hold the block while being cut. In order to make the operation automatic, one or both of the dogs *c* is connected to a spring or lever, *i*, in such a manner as to press the dog tightly against the end of the block, and thus hold it securely until the carriage is driven nearly back, when said spring or lever *i* is pressed outward by the pivoted lever *s*, which is forced outward against it by the pin *p* on the carriage. As the block is thus released, it drops down upon the tilting frame *f*, located immediately beneath it, as shown in Figs. 2 and 3. On this frame the block rests until the carriage moves forward far enough to release the spring *i* from the lever *s*, when it presses the dogs into the ends of the block, and thus holds it while being cut.

As the block is not changed end for end in cutting the shingles, it is necessrry that some means be provided for tilting up first one and then the other end of the block, so as to cut the shingle butt and point alternately from the block. To accomplish this, the tilting frame or platform *f* is provided. As already explained, this frame *f* is located near the end of the frame A, directly under the carriage when the latter is driven back, where it is in a position to receive the block, as the latter is unlocked from the dogs *c c*. This frame *f* is pivoted at its center, as clearly shown in Fig. 3, and under the frame *f* is placed a transverse horizontal shaft, *r*, having cams or projections *m* at each end. These projections *m* are placed two at each end of the shaft, and on opposite sides of the shaft, those at one end being placed at right angles to those at the opposite end. On one end of the shaft *r* is secured a ratchet-wheel, N, of the form shown in Fig. 1. A pawl, *t*, is pivoted to the carriage in line with the wheel N in such a position that as the carriage moves forward the pawl is raised up and passes over the wheel N; but as the carriage is forced back the end of the pawl *t* will strike against one of the points *a'* of the wheel N, thereby causing the shaft *r* to rotate until the succeeding point *a'* comes in contact with the under side of the pawl *t*, which prevents any further rotation of the shaft *r*, and at the same time raises the pawl up, so as to cause it to pass back over the wheel N, as shown in Fig. 1. By this means the shaft *r* is given a quarter-turn at each backward movement of the carriage, which causes one of the projections *m* to strike against the under side of the frame *f*, and thus raise that end of the frame, the other of course being correspondingly depressed. At the next movement of the shaft *r* that projection *m* is moved over out of the way, and one at the opposite end of the shaft is brought under the frame *f*, thereby elevating that end, while the end that was previously elevated is depressed. By these means the block is alternately raised and lowered at its opposite ends, and the shingles are consequently cut therefrom, butts and points alternately, thus enabling me to cut up the entire block until it becomes too narrow to make a shingle.

It will of course be understood that the devices at one end of the frame A are an exact duplicate of those at the opposite end, and are operated in the same manner.

L represents a metallic spring, having its opposite ends attached to the carriages P and P', as shown in Figs. 1 and 2, its function being to force the carriages back as soon as the arm O is released from the rod *n* or *n'*.

Figure 4:
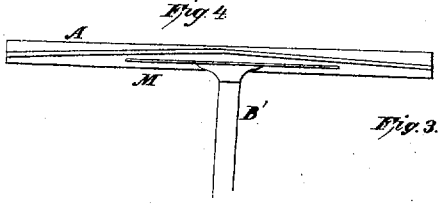

The ways upon which the carriages P and P' move are inclined, so that as they approach the center of frame A the carriages and the blocks secured therein are slightly raised to prevent their binding upon the surface of the saw, or, as it is technically termed, to give it "rake," as clearly shown in Fig. 4.

If desired, planes may be attached to the upper face of the saw, for the purpose of smoothing the under side of the block as each shingle is cut therefrom; but by my machine the shingles are sawed so smooth that I find them entirely unnecessary.

It will be readily perceived that by changing the position of the arms *n* and *n'* the feed motion of the carriages may be varied at will. Instead of moving fastest at first, they may be made to move slowest at first and fastest during the last part of the cut; or they may be arranged to increase at first, receiving their maximum speed midway of the cut, and then decrease during the latter part of their movement.

It is also obvious that many other mechanical arrangements may be used to accomplish this result, and hence I do not intend to confine myself to the precise arrangement of devices here shown.

In this manner I construct a machine that operates with extreme rapidity, is strong and simple, and in which the process of cutting the shingles is entirely automatic, the attendant having nothing to do but supply it with blocks as they are converted into shingles.

Having thus fully described my invention, what I claim is—

1. The carriages P and P', connected by the spring L, and arranged to operate as and for the purpose herein set forth.

2. Giving to the carriages of a shingle-machine a variable feed, substantially as and for the purpose set forth.

3. The dogs *c c*, arranged to operate in connection with the spring *i* and lever *s*, or their equivalents, for the purpose of automatically locking and unlocking the block, as described.

4. The tilting platform *f*, in combination with the shaft *r*, provided with the projections *m*, arranged to operate, as shown, for the purpose of presenting the block to the saw in such a manner as to cut the butt alternately from opposite ends of the block.

5. The ratchet-wheel N, arranged to operate in connection with the pawl *t* of the carriage, as shown and described, for the purpose of imparting motion to the shaft *r*, and thereby tilt the platform or frame *f*, as and for the purpose set forth.

6. The double-inclined ways, in combination with the carriages P and P′, when the latter are arranged to operate alternately on opposite sides of a single saw, as herein shown and described.

W. P. VALENTINE.

Witnesses:
CHARLES ROGERS,
ALBERT BRAUSS.